US005457952A

United States Patent [19]
Almhem et al.

[11] Patent Number: 5,457,952
[45] Date of Patent: Oct. 17, 1995

[54] AIR FLOW CONTROL SYSTEM IN PFBC PLANTS

[75] Inventors: Pär Almhem, Lotorp; Hjalmar Nevestveit, Finspong, both of Sweden

[73] Assignee: ABB Carbon AB, Finspong, Sweden

[21] Appl. No.: 204,406

[22] PCT Filed: Aug. 31, 1992

[86] PCT No.: PCT/SE92/00595

§ 371 Date: Mar. 14, 1994

§ 102(e) Date: Mar. 14, 1994

[87] PCT Pub. No.: WO93/06351

PCT Pub. Date: Apr. 1, 1993

[30] Foreign Application Priority Data

Sep. 13, 1991 [SE] Sweden .................................. 9102651

[51] Int. Cl.⁶ .................................. F02C 3/26; F02C 9/22
[52] U.S. Cl. ..................... 60/39.03; 60/39.25; 60/39.464
[58] Field of Search .................................. 60/39.03, 39.04, 60/39.12, 39.161, 39.25, 39.464

[56] References Cited

U.S. PATENT DOCUMENTS 4,530,207  7/1985  Brannstrom .
4,545,198 10/1985  Yoshida ................................. 60/39.25
4,893,466  1/1990  Egnell et al. .
5,193,337  3/1993  Harboe et al. ........................ 60/39.25

FOREIGN PATENT DOCUMENTS 2812237 10/1978  Germany ............................. 60/39.25
 452179  2/1986  Sweden .

*Primary Examiner*—Louis J. Casaregola
*Attorney, Agent, or Firm*—Pollock, Vande Sande & Priddy

[57] ABSTRACT

Air flow is controlled in a PFBC plant comprising a combustor and a pressure vessel, a two-shaft gas turbine consisting of a low-pressure compressor LC and a low-pressure turbine LT interconnected by a shaft and a high-pressure compressor HC and a high-pressure turbine interconnected by a shaft. Air is sucked into LC, is passed on to HC and via an intercept valve into the pressure vessel and the combustor, whereafter the return flow is passed via the intercept valve to HT and further to LT, from where the return flow is released into the free environment. To control the air flow the set value ($G_{set}$) of the air flow control is calculated on the basis of the of the bed level and the actual value ($G_{value}$) is calculated from the available process parameters, and both are supplied to the regulator of the air flow control system, the output of which regulator controls the member for executing the control which is in the form of a guide vane ring with adjustable guide vanes and is provided at the inlet to LT.

10 Claims, 3 Drawing Sheets

5,457,952

AIR FLOW CONTROL SYSTEM IN PFBC PLANTS

TECHNICAL FIELD

The present invention relates to methods and devices for ensuring that the pressure vessel and the combustor of a PFBC plant are, at all times, pressurized with the aid of air flow means and that the proper quantity of air is supplied in each load case.

BACKGROUND OF THE INVENTION

PFBC plants have been described in a great number of publications and patent specifications. One example of such a description is given in EP 0124842 entitled "Power plant with a fluidized bed combustion chamber" and corresponding to U.S. Pat. No. 4,530,207. A so-called PFBC plant includes a compressor unit and a turbine unit in which a low-pressure compressor and a low-pressure turbine are interconnected via a first shaft and a high-pressure compressor and a high-pressure turbine are interconnected via a second shaft.

In a PFBC plant there is a relatively clear-cut relationship between the bed level of the combustor and the load. To be able to maintain this relationship and to obtain optimum operation, a large number of more or less connected systems are required. To cover the fuel consumed during the combustion, the proper quantity of fuel must be continuously supplied to the combustor. This is done with the aid of a fuel supply control. The combustion of supplied mass for optimum use thereof and for keeping the waste gases within permissible limits requires at all times the correct amount of air flow to the pressure vessel and to the bed of the PFBC plant. According to the above, the present invention comprises a control system which satisfies these requirements.

Upon a change of load, in addition to both the fuel supply and the air flow being changed, also the bed level must be adapted to the new load. The bed level may be adjusted in several ways, among other things by feeding bed material from the bed either out into a storage vessel located outside the bed, or from the storage vessel into the bed. This method is described, inter among other things in the above-mentioned EP specification.

The system which supplies the combustor with compressed air comprises a two-shaft gas turbine in which, as mentioned above, the low-pressure compressor (LC) and the low-pressure turbine (LT) are interconnected by a fixed shaft and the high-pressure compressor (HC) and the high-pressure turbine (HT) are interconnected by a fixed shaft. The high-pressure unit drives a generator via a star gear.

In addition to the system mentioned, PFBC plants comprise means for control of bed temperature, feedwater and the like, which are all in different ways connected in dependence on the prevailing load and load changes. Most of these systems have limitations from the point of view of process engineering. For the air flow control these comprise use the difference pressure between the pressure vessel and the bed vessel as well as the pressure ratio between the inlets and outlets of compressors, the minimum and maximum speed of the low-pressure shaft, the rate of change of several of the controlled quantities and the like which become active and influence each other.

The passage of the air through the compressors and up to the fluidized bed as well as the passage of the corresponding waste gases through the turbines and out into the free environment are part of the prior art and will therefore only be briefly described here. Air is admitted into the low-pressure compressor and is passed on via an intermediate cooler to the high-pressure compressor. From there the air is passed into the pressure vessel which thereby becomes pressurized with a certain overpressure in relation to the combustor. The waste gases which are generated during the combustion are now passed from the combustor via cyclones to the high-pressure turbine and from there on to the low-pressure turbine from where the gases are released, possibly after cleaning and cooling, into the free environment.

The air and gas passage through the compressor and turbine units, as described above, need not, of course, be associated with a fluidized bed plant. SE 8602003-9 corresponding to U.S. Pat. No. 4,893,466 entitled "A method for operation of a turbine unit" describes how such a turbine unit may be used together with other types of combustors for, for example, operation of an electric generator connected to the common shaft for the high-pressure compressor and the high-pressure turbine. From the design of this plant it can be deduced that the device for executing control of the power of the generator consists of a guide vane ring, connected to the inlet of the low-pressure turbine, with adjustable guide vanes through which the gas flow from the high-pressure turbine and to the low-pressure turbine has to pass.

Otherwise, it is of interest to note that the above SE patent only mentions devices for air supply under pressure to the combustor and does not disclose any form of the air flow control. As far as it is known, no individual control of the air flow in known PFBC plants exists at present.

BRIEF DESCRIPTION OF THE DRAWINGS

FIG. 3 shows the configuration of the selection system which determines what control is to be switched on.

SUMMARY OF THE INVENTION

Figure 1:
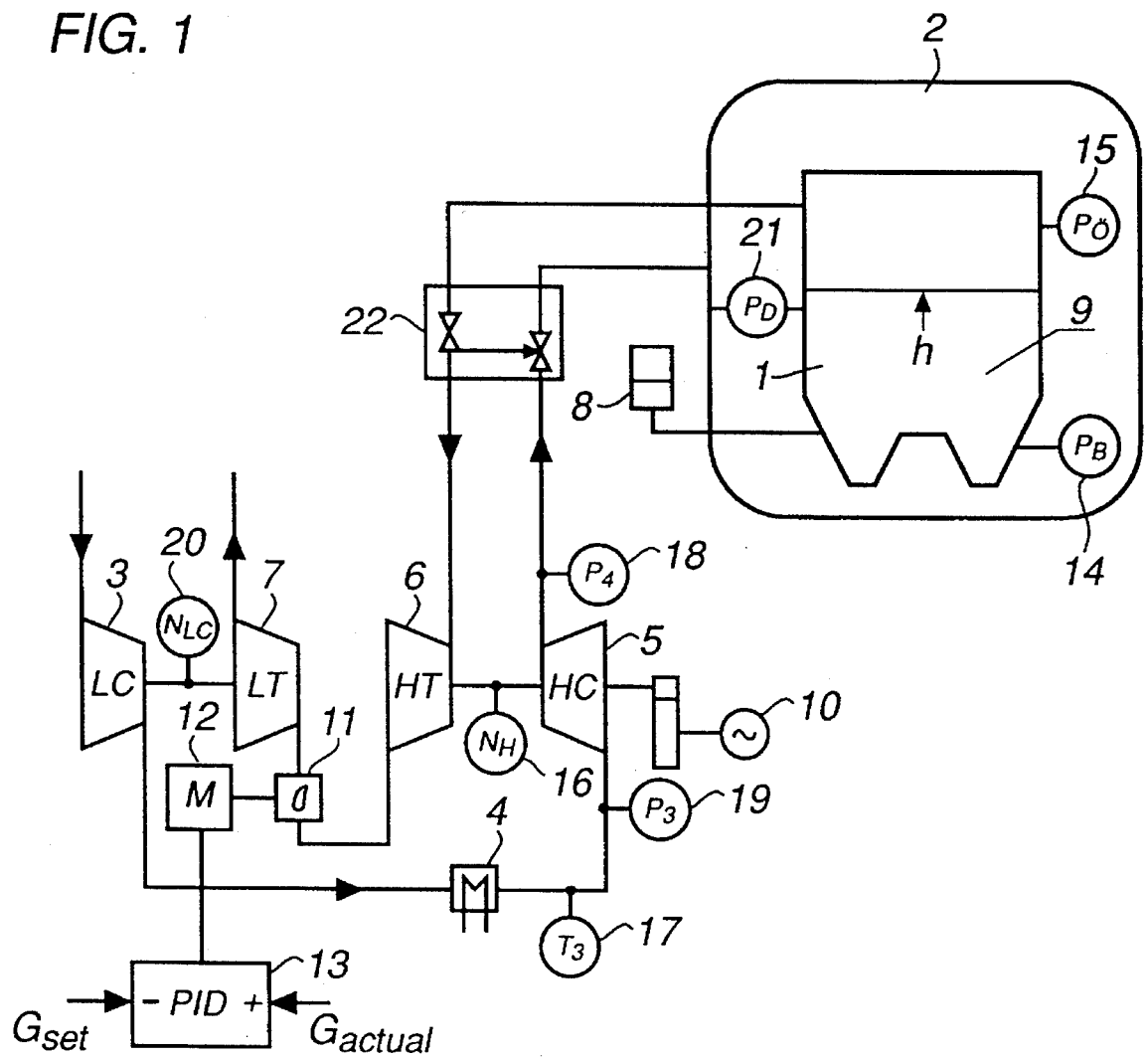
FIG. 1 shows the parts of a PFBC plant to which the invention is directed, with the measuring points required for the different controls.

FIG. 1 shows the parts of a PFBC plant which constitute the most important components of an air flow system, as largely described also in the above-mentioned patent documents. Numeral 1 designates a combustor inside a pressure vessel 2. Air is sucked into the low-pressure compressor 3 and passes through an intermediate cooler 4 on its way to a high-pressure compressor 5. From there the air is passed into the pressure vessel 2. The gas from the combustor is passed via cyclones (not shown) to a high-pressure turbine 6 and on its way out into the free environment the gas passes through a low-pressure turbine 7. The figure also shows a storage vessel 8 with bed material used for adjustment of the bed level "h" in connection with load changes. Fuel is intended to be injected at the inlets 9. To the high-pressure shaft there is connected an electric machine 10 which upon start-up may operate as a motor and which in normal operation may operate as a generator. Output of power from tubes present in the bed is not shown in the figure.

An air flow control according to the present invention comprises a new concept for such a control since as a control executing member in the air flow control there is used a guide vane ring 11 with adjustable guide vanes on the input side of the low-pressure turbine. This means that the air flow is regulated by influencing the gas flow by means of the guide vane ring. The guide vane ring is the same as that which according to SE 8602003-9 is used as executive member for power control of the electric generator included therein. The operating member of the guide vane ring is shown at 12 and this member is influenced by the PID-connected air flow regulator 13. In the usual manner the air flow control has a set value, $G_{set}$, and an actual value, $G_{actual}$. The air flow is normally measured in kg/s.

The control concept described in FIG. 1 constitutes an exceedingly simplified picture of the actual control system for the air flow control. The reason for this are the above-mentioned limitations which such a system must take into consideration. These will be described in greater detail below under the description of embodiments of the present invention.

An important problem in an air flow control system is that the set value must automatically and at all times correspond to the current load, that is, also correspond to the bed level. The relationship between air flow requirement $G_{set}$ and load or bed level may for a certain fuel material be calculated as a function where also the temperature of the bed and the thermal value of the fuel and the like are included as parameters. Thus, for a certain given fuel the set value may be written as $$G_{set}=f(h)$$

Whether the calculation of the necessary air quantity is based on the load or the bed level is largely irrelevant. It should be noted, however, that the load can be measured relatively accurately with more or less conventional measuring methods. However, obtaining a measure of the current bed level is more difficult. One way is to measure the pressure difference between the pressure, $P_B$, in the bottom of the combustor and the pressure $P_Ö$ in the so-called freeboard. The reason is that there is a given relationship between the pressure difference and the bed level "h". Pressure gauges used for this purpose are shown at 14 and 15 in FIG. 1.

Another and equally important requirement is to obtain a reliable measure of the actual value of the air flow. Among other things because direct-measuring air flow meters give rise to pressure drops across the meter itself, the current measured value is instead formed with the aid of known calculable relationships between measurable parameters. In that connection, a normalized speed $N_n$ for the high-pressure compressor is first calculated according to the following relationship $$N_n=N_H\sqrt{(416/T3)}$$

where $N_H$ is the physical speed, that is, the speed measured directly on the high-pressure shaft, and where $T_3$ is the temperature of the air in kelvin before the high-pressure compressor. The respective measuring means are shown at 16 and 17 in FIG. 1. With the aid of produced multitudes of curves for different normalized speeds, the normalized compressor air flow $G_n$ versus the pressure ratio $P_4/P_3$ across the high-pressure compressor can be determined. This pressure ratio is called π-value within the current technical field and will come into the picture in a most obvious way in connection with some of the limiting controls which will be described below. Measuring means for these pressures are shown at 18 and 19 in FIG. 1. The air flow through the high-pressure compressor can then be calculated according to the following relationship $$G_{actual}=G_nP_3N_n/3,63$$

where $P_3$ is the pressure of the air immediately before the high-pressure compressor.

The speed $N_{LC}$ of the low-pressure unit must not be below a given minimum value or above a certain maximum value. The measured value for this speed is included in the limiting control which continuously ensures that the speed lies within permissible limits. The measured value is obtained by a measured value transducer shown as 20 in FIG. 2.

The limiting controls also include the pressure difference between the pressure vessel and the combustor. A measured value of this difference pressure DP may be obtained with the pressure difference gauge 21.

FIG. 1 also shows a so-called intercept valve 22 through which the air flow to the pressure vessel and the gas flow from the combustor can be influenced. The task of the value will be explained in greater detail below under the description of the embodiments.

The different control limitations such as the π-control, the speed control of the low-pressure compressor, the difference pressure control and the like are included together with the main control with the PID-connected air flow regulator in a selection system according to the present invention and the output signal of which corresponds to the most predominant of the controls and this signal is finally supplied to the operating device 11 according to FIG. 1 for control of the adjustable guide vanes of the guide vane ring. The selection system works with analog signals when it comes to deciding what control is to be switched on. In addition, the selection system comprises logic signals which relate to the switching on and off of the air flow control, startup and run-down of the plant as well as various faults which may occur. The configuration of the selection system will be described in greater detail under the description of the embodiment.

It is, of course, important in a control concept of the type described here that the change between the different control systems when these relieve each other takes place as smoothly as possible and without too violent "jumps" in the signal to the control executing member. To accomplish this according to the invention, the output signal from the selection system, that is, the control signal to the control executing member, independently of what control is switched on, is fed back to all the control systems as a follow-up set value which ensures that the outputs of all the regulators have an output signal which only by a given small margin differs from the output of that regulator which is switched on.

DESCRIPTION OF THE PREFERRED EMBODIMENTS

Figure 2:
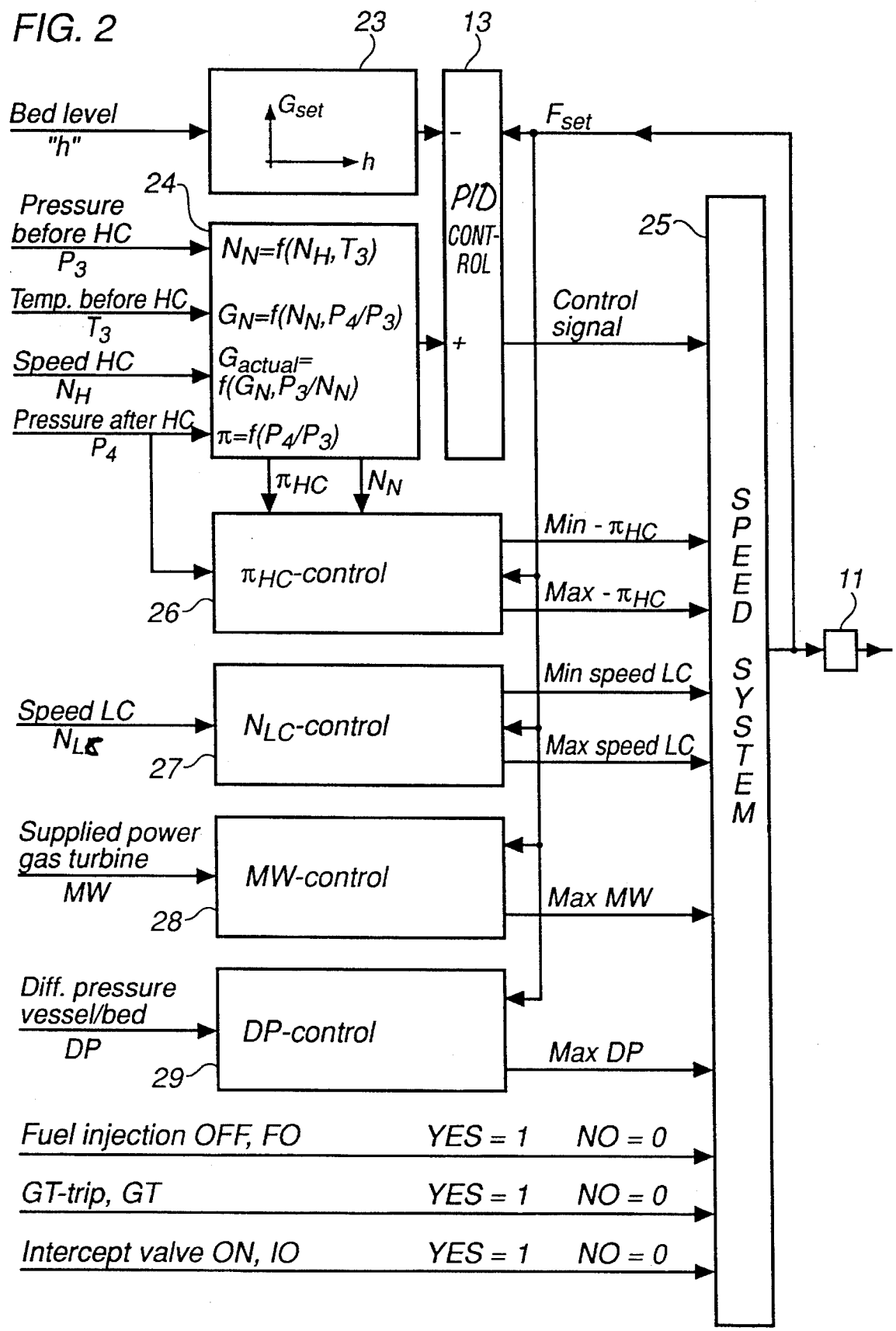
FIG. 2 shows a summary of the controls and limiting signals which are included in the air flow control system.

FIG. 2 shows a diagram of the measurement and control signals which are included in the air flow control and the limiting controls which are associated therewith. Under the "Summary of the Invention" a description is given of how both the set value and the actual value for the air flow control is produced. The production of these quantities are therefore shown only symbolically in FIG. 2 in the form of the set value calculator 23 and the actual value calculator 24. Input signal to the set value transducer is, in the example shown, the bed level "h" which is assumed to have been obtained in some known way, for example via the pressure difference measurement between $P_Ö$ and $P_B$ as previously described.

The determination of the actual value for the air flow is performed, as mentioned above, with the aid of measured values for pressure upstream and downstream of the high-pressure compressor, the temperature downstream of the high-pressure compressor and the speed of the high-pressure unit, which values are supplied to the actual value calculator which, with access to stored characteristics for normalized air flow of the high-pressure compressor for different π-values for normalized speeds thereof, may supply an actual value for air flow.

FIG. 2 also shows the PID-connected air flow regulator 13 according to FIG. 1. The output of the regulator, that is, the control signal to the operating member of the guide vane if this control is switched on, is supplied to the selection system 25 which will be described in detail below. As mentioned, the selection system determines which control system is to be switched on and the output signal from the selection system is supplied to the operating device 11 of the guide vane according to FIG. 1. To avoid an intermittent transition between the different control systems when the selection system determines that another control means is to become activated, each control will be supplied with a follow-up set value Fset, as described above and shown in FIG. 2, which continuously ensures that each control system receives a control output signal which differs, by a small deviation only, from the control signal which is activated.

Under normal operation the compressors must operate within a certain operating range. If the working point approaches the limits of the working range, problems with so-called surging and choking may arise. These phenomena may lead to considerable damage on the compressor and must therefore be avoided. If the working point of the compressor should arrive outside the working range and below the curve corresponding to the choking limit, choking occurs, and if the working point should arrive outside the working range and above the curve corresponding to the surging limit, surging occurs. The air flow control is therefore supplemented by a limiting control referred to as $\pi_{HC}$-control, symbolically shown at 26 in FIG. 2. To obtain a certain margin to the actual limit curves, this control is based on a π-surging limit curve which lies below the actual limit curve for surging and a π-choking limit curve which lies above the actual limit curve for choking. As is otherwise clear from FIG. 2, this control has as input signal the $\pi_{HC}$-value and the normalized speed $N_N$ of the high-pressure compressor, which both values are obtained in connection with the production of the actual value for the air flow control as well as the pressure after the high-pressure compressor. The $\pi_{HC}$-control comprises two regulators, one of which supplies a control signal "Min π" and the other a control signal "Max π" which, when the operating range starts to approach the respective limit regions, exert an influence on the air flow control in such a way that these signals, via the selection system, are determining for the position of the guide vane ring. In the same way as for the PID regulator, the $\pi_{HC}$-regulators are supplied with the follow-up set value $F_{set}$ to avoid disturbing jerks in the control when any of these controls is switched on.

A brief description as to when the surging and choking problems arise and how the Max-π and Min-π values are obtained for the different air flows will now be given. On each one of the curves for normalized speeds in the multitude of curves which provides the relationship between π and the compressor air flow there is a point where surging and choking, respectively, are initiated. If the points for surging on all the curves in the multitude of curves are linked together, a coherent curve is obtained which is called the surging curve, and if in similar manner the points for choking are linked together, a coherent choking curve is obtained. The region between these two curves defines the permissible working range of the compressor. To provide margins to these limit curves, π-limit curves according to the above have been decided. The Max-π regulator then sees to it that a set value for the Max-π control is generated which has such a value that the working point of the compressor by a certain margin does not come too close to the π-surging limit curve, that is, lies below the π-surging limit curve. Suitably, a maximum curve is assumed which is determined by a curve equal to 0.9 times the π-surging limit curve. In a corresponding manner, the Min-π regulator provides a set value for Min-π control when an operating position approaching the region for choking is about to be obtained. For reasons of process technique a margin in relation to the π-choking limit curve has been selected which is dependent on the pressure after the high-pressure compressor, that is, $P_4$, and for that reason also a measured value for this pressure is supplied to the π-regulator. When the pressure after the high-pressure compressor is greater than a certain pressure, for example 3.5 bar, a Min-π value is used which is determined by the π-choking limit curve and when the pressure is lower, a curve which is a few per cent lower than the π-choking limit curve is used. However, this value, of course, also permits a satisfactory margin in relation to the actual choking limit curve.

As already mentioned, the low-pressure unit is not allowed to operate at speeds below a certain minimum speed or above a certain maximum speed. If there are tendencies in that direction, the limitation is to take over the control of the guide vane ring via the selection system. The measured value for the speed of the low-pressure unit, as it can be obtained from the transducer 20 in FIG. 1, is therefore supplied to the $N_{LC}$ control 27 in FIG. 2. From there a signal "Minspeed LC" is obtained if the actual speed drops to the lowest permissible speed and a signal "Maxspeed LC" is obtained if the speed is increased to the highest permissible. One of these signals will determine the mode of running of the air flow system via the selection system if this signal is the predominant one of all control signals that is, having the highest control priority. As is clear from the figure, also this control is supplied with the follow-up set value $F_{set}$.

As previously described, an electric machine 10 according to FIG. 1 is connected to the shaft of the high-pressure unit. During normal operation this machine operates as a generator and delivers electrical power to the power network. The same machine may also advantageously be used as a motor for start-up of the high-pressure unit and then draws power from the network. In order not to overload the shaft between the high-pressure compressor and the turbine, however, the power from the network to the machine operating as a motor must be limited. A measured value of this power is therefore supplied to a maximum power control device 28 according to FIG. 2. This control device operates in exactly the same way as the DP control. This means that the output signal follows the output signal of the selection system because of the follow-up set value $F_{set}$ for as long as the input signal, that is MW, lies below a maximally allowed value set in advance. When the supplied power amounts to the maximally allowed value, a control signal "Max MW" is obtained which, in the same way as for the other control systems, is supplied to the selection system.

The air flow which is supplied to the pressure vessel tends to give this vessel an overpressure in relation to the combustor. The difference pressure must be limited to a maximum value and the measured value DP of the difference pressure DP, obtained with the aid of the transducer 21 according to FIG. 1, is therefore supplied to the difference pressure control device 29 according to FIG. 2. This control device operates in the same way as the other control systems in that the output signal, for as long as the difference pressure is below a permissible maximum value set in advance with a certain margin, because of the follow-up set value delivers a signal which follows the signal which is currently switched on. If, on the other hand, the input signal, that is DP, exceeds the set value, the DP control delivers a "Max DP" signal which, if the other conditions are fulfilled, is allowed to determine the movement of the guide vanes via the selection system. The maximum permissible difference pressure in a plant designed according to the invention has been set at 0.55 bar.

The status of the fuel injection concerns the operating state of the whole PFBC plant and information about the condition (FO) must therefore be supplied to the selection system.

If, for some reason, the gas turbine unit comes outside its permissible working range so that, for example, surging of the low-pressure compressor and surging of the high-pressure compressor occur, that the maximum speed of the low-pressure compressor is exceeded, that vibrations occur on the units, and the like, a function called GT trip is triggered. Upon a GT trip, special measures must be taken and it is therefore important that the selection system is informed of this (GT).

As mentioned above, during start-up of the plant the high-pressure unit is driven by the electric machine, connected to the common shaft and fed from the network. Only when the speed of the unit has reached the speed which corresponds to the necessary speed to be able to phase the machine into the network, is it opened for air supply to the pressure chamber and also for gas outlet from the combustor. This opening is performed with the intercept valve 22 according to FIG. 1. It is therefore important for the selection system to know whether the intercept valve has opened or not (IO).

Information about the states of the above functions is obtained in the form of logical 0- and 1-signals which are supplied to the selection system. That part of the selection system which is to process these input signals must then be designed for logic processing and is for this purpose designed such that the 0- and 1-signals have the following meaning:

| Fuel injection, OFF | Yes = 1, No = 0 |
| Intercept valve, ON | Yes = 1, No = 0 |
| GT trip | Yes = 1, No = 0 |

Figure 3:
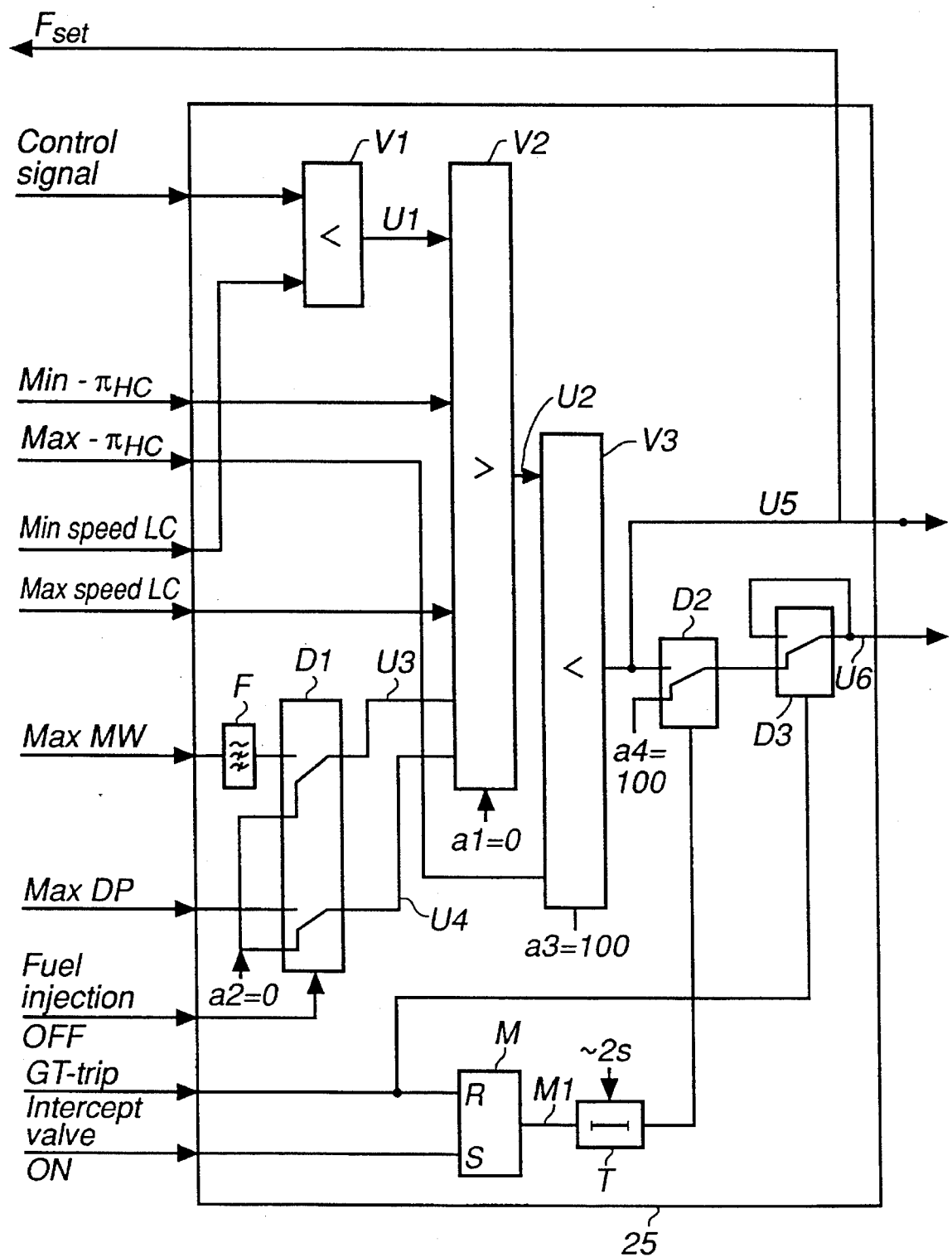

The selection system 25 according to FIG. 2 can be designed in a plurality of different ways depending on the desired control and protection strategy and whether input and output signals are analog and/or digital signals. The selection system may also be built up in a more or less integrated form within the scope of the invention. A preferred embodiment is shown in FIG. 3. Since the input signals in the described embodiment consist of both analog and digital signals, the selection system must comprise both analog and digital selectors for the logic decisions that are to be made. All the digital selectors in FIG. 3 are drawn in a position in which the activation signal from the logic inputs are 0.

Selector V1 is a first minimum selector whose output signal U1 is the smaller of the control signal and the signal Minspeed LC. The output signal is passed to a maximum selector V2 whose output signal U2 consists of that of the input signals thereto which is the greater. Besides U1, the input signals also comprise the signals from Min-π, Max-speed LC and the signals U3 and U4 from a first digital selector D1, and a reference signal a1=0. When D1 is not activated, both U3 and U4 will have the value zero because of the reference signal a2=0. The first digital selector is activated, as is clear from FIG. 3, by the signal Fuel injection when this changes from 0 to 1. U3 will then be equal to a Max MW signal filtered in the filter F and U4 will be equal to the Max DP signal.

The greatest of all the input signals to V2 will now, as the signal U2, be supplied to a second minimum selector which there are also supplied the signal from Max-π and a reference signal a3=100. The output signal from V3, that is U5 according to FIG. 3, consists of the control signal which is passed to the operating device of the guide vane unless the logical signals from Intercept or GT trip are activated and request otherwise.

If none of a second digital selector D2 and a third digital selector D3 is activated, the output signal U6 from D3, because the reference a4 of D2 corresponds to the maximum control signal to the operating device of the guide vane, will thus be guided towards an open guide vane ring. In such a state the control signal U5 to the operating device will be disconnected. If D3 is activated, that is, if a GT trip is obtained, the output signal U6 from D3, because of the feedback according to the figure, will retain the value of the signal prevailing prior to the activation independently of the state of D2. As is clear, the signal U5 also forms the follow-up set value $F_{set}$.

The activation state of the digital selector D2 is determined by the logical signals from Intercept and GT trip. As is clear from the figure, these signals are passed to a memory M with a subsequent time lag element T. The relationship between the input signals to the S- and R-inputs on the memory and its output is clear from the following summary:

| Intercept signal | S | 0 | 1 | 0 | 1 |
| GT trip | R | 0 | 0 | 1 | 1 |
| M signal | M1 | 0 | 1 | 0 | 0 |

As will be clear, it is only the combination of S=1 and R=0, that is, normal operating state with a switched-on intercept valve and no GT trip, that may trigger D2, which can be done at the earliest, after a certain time determined by the time lag element T. This means that during normal operation the two control signals U5 and U6 have the same value, and if a GT trip should occur, D3 will be locked to the control signal prior to the occurrence of a GT trip.

Then when a GT trip has been corrected, that is, the GT trip signal becomes zero, U6 is increased 100%. Only when the intercept valve is opened, does the normal control switch in U6=U5.

We claim:

1. A method for air flow control in a PFBC plant including a combustor, a pressure vessel, a two-shaft gas turbine consisting of a low-pressure compressor LC and a low-pressure turbine LT interconnected by a shaft as well as a high-pressure compressor HC and a high-pressure turbine HT interconnected by a shaft, wherein air is sucked into the low-pressure compressor LC, is passed on to the high-pressure compressor HC and via an intercept valve into the pressure vessel and the combustor, whereafter the return flow is passed via the intercept valve to the high-pressure turbine HT and further to the low-pressure turbine LT from where the return flow is released into the free environment, the inlet to LT being provided with a guide vane ring with adjustable guide vanes, said method comprising the steps of:

forming a set value ($G_{set}$) for the air flow for the current fuel based on the relationship between the level of the bed material in the combustor, the bed level h, and the necessary air flow;

obtaining an actual value ($G_{actual}$) of the air flow based on known calculable relationships between measurable parameters;

supplying the set and actual values to a regulator, and supplying the output signal of the regulator to control an air flow control means which is constituted by said guide vane ring with the rotatable guide vanes.

2. A method according to claim 1 wherein an electric machine is connected via a gear unit to the same shaft as said high pressure compressor HC and said high pressure turbine HT and wherein information about the power (MW) supplied to the machine during start-up of the PFBC plant is supplied to the air flow control system together with information about the speed ($N_{LC}$) of said low pressure compressor LC and information about the difference pressure (DP) between the pressure vessel and the combustor, and wherein the air flow control means includes;

a) a limiting control for pressure ratio $\pi_{HC}$ across the high pressure compressor HC from which limiting control signals for limiting pressure ratio (Min-$\pi$, Max-$\pi$) are delivered and switched into the air flow control if the working point for the high-pressure compressor HC approaches the limit area for choking or surging, b) a limiting control for the speed $N_{LC}$ of low-pressure compressor LC from which limiting control signals (Minspeed LC, Maxspeed LC) are delivered and switched into the air flow control when the speed of low-pressure compressor LC starts approaching the respective limit values, c) a limiting control for maximum allowed supplied power to the electric machine during start-up, from which a limiting control signal (Max MW) is delivered and switched into the air flow control when the supplied power starts approaching the maximum allowed value, and d) a limiting control for maximum allowed difference pressure (DP) between pressure vessel and combustor from which a limiting control signal (Max DP) is delivered and switched into the air flow control when the difference pressure starts approaching the maximum allowed value.

3. A method according to claim 1 wherein the air flow control system is supplied with signals containing information as to whether fuel injection is being performed or not, (FO) signal, information as to whether a GT trip has occurred or not, (GT) signal, and information as to whether the intercept valve is switched on or not, (IO) signal, and wherein said signals FO, GT and IO are used as interlocking signals for interlocking/blocking of the air flow control system.

4. A method according to claim 2 wherein the air flow control system is supplied with signals containing information as to whether fuel injection is being performed or not, (FO) signal, information as to whether a GT trip has occurred or not, (GT) signal, and information as to whether the intercept valve is switched on or not, (IO) signal, and wherein said signals FO, GT and IO are used as interlocking signals for interlocking/blocking of the air flow control system.

5. A method according to claim 4 wherein the air flow control system comprises a selection system which is supplied with the control signal from the regulator, the limiting control signals Min-$\pi$, Max-$\pi$, Minspeed LC, Maxspeed LC, Max MW and Max DP from the limiting controls and the interlocking/blocking signals FO, GT and IO and wherein an output signal from said selection system corresponds to that input signal which currently has the highest control priority, said output signal constituting the control signal supplied to an operating device for the operation of the guide vanes.

6. A method according to claim 5 wherein regulators are provided for limiting controls and wherein all the regulators included in the control system are supplied with a follow-up set value $F_{set}$ signal equal to the control signal supplied to the operating device and which controls the outputs of all the regulators, except for the one that is switched on, to a value which is somewhat lower or higher than the current control signal.

7. A method according to claim 6 wherein the actual value ($G_{actual}$) of the air flow is based on the relationship between the speed (NH) of the high pressure compressor HC, the temperature (T3) of the air flow before HC, the normalized speed ($N_n$) for HC, the pressure before (P3) and after (P4) HC and the normalized compressor air flow (GN) as a function of the pressure ratio $\pi$.

8. A device for air flow control in a PFBC plant which includes a combustor, a pressure vessel, a two-shaft gas turbine including a low-pressure compressor LC and a low-pressure turbine LT interconnected by a shaft and a high-pressure compressor HC and a high-pressure turbine HT interconnected by a shaft, an intercept valve, and a guide vane ring with adjustable guide vanes being provided at the inlet to LT, said device comprising means for forming a set value and an actual value for the air flow and an air flow regulator, and wherein the guide vane ring with adjustable guide vanes is controlled by the air flow regulator and is arranged in the air flow control.

9. A device according to claim 8, wherein for limiting control of the air flow control means the device comprises a first regulator for minimum and maximum limitation of the ratio $\pi_{HC}$ between the pressure after ($P_4$) and before ($P_3$) the high pressure compressor HC and which supplies control signals Min$\pi$ and Max-$\pi$, a second regulator for minimum and maximum limitation of the speed ($N_{LC}$) of the low pressure compressor LC and which supplies control signals Minspeed LC and Maxspeed LC, a third regulator for maximizing the supplied power to a machine connected to the same shaft as the high pressure compressor HC and high pressure turbine HT in connection with start-up of the PFBC plant and which delivers a control signal Max MW and a fourth regulator for maximizing the difference pressure (DP) between the pressure vessel and the combustor and which delivers a control signal Max DP.

10. A device according to claim 8, wherein for evaluation of which control system is to be switched on or whether interlocking/blocking signals with information about the status of the fuel injection (FO), GT trip (GT) or an intercept valve (IO) included in the system should be determining for the control of the guide vanes of the guide vane ring, the device is provided with a selection system adapted for receiving input signals from the control systems and the interlocking/blocking signals, the selection system comprising analog minimum selectors (V1, V3) and maximum selectors (V2), and digital selectors (D1, D2, D3) which deliver, an output signal from the selection system, which is the one of the input signals of the selection system which has the highest control priority, said output signal constituting the control signal for the guide vanes of the guide vane ring.

* * * * *